(12) United States Patent
Kurataka et al.

(10) Patent No.: US 6,974,643 B2
(45) Date of Patent: Dec. 13, 2005

(54) SERVO PATTERN FORMATION VIA TRANSFER OF SOL-GEL LAYER AND MAGNETIC MEDIA OBTAINED THEREBY

(75) Inventors: Nobuo Kurataka, Campbell, CA (US); Hong Ying Wang, Fremont, CA (US); Neil Deeman, Alamo, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/821,871

(22) Filed: Apr. 12, 2004

(65) Prior Publication Data

US 2004/0191575 A1    Sep. 30, 2004

Related U.S. Application Data

(62) Division of application No. 10/079,516, filed on Feb. 22, 2002, now Pat. No. 6,723,198.

(60) Provisional application No. 60/293,839, filed on May 24, 2001.

(51) Int. Cl.$^7$ .......................... B44C 1/165; B32B 5/66; C03B 37/06
(52) U.S. Cl. ............... 428/848.1; 428/848.8; 156/232
(58) Field of Search .................. 428/65.3, 694 MP, 428/694 TS, 694 ST, 611, 687, 64.2, 145, 428/325, 410, 429, 694 SG, 331, 848.1, 848; 65/395, 404, 17.5, 208; 427/129, 130, 131; 156/232; 501/54, 12; 369/275.1, 275

(56) References Cited

U.S. PATENT DOCUMENTS

| | | | | |
|---|---|---|---|---|
| 3,935,359 | A | * | 1/1976 | Rowland .................. 156/231 |
| 4,595,440 | A | * | 6/1986 | Lynch ..................... 156/232 |
| 5,067,039 | A | * | 11/1991 | Godwin et al. .......... 369/275.1 |
| 5,090,982 | A | * | 2/1992 | Bradshaw et al. ....... 369/275.4 |
| 5,234,717 | A | * | 8/1993 | Matsuno et al. .......... 427/131 |
| 5,626,802 | A | * | 5/1997 | Slaughter, Jr. ............ 156/232 |
| 5,863,679 | A | * | 1/1999 | Tsushima et al. ......... 427/131 |
| 6,027,017 | A | * | 2/2000 | Kuhn et al. .............. 156/230 |
| 6,027,595 | A | | 2/2000 | Suleski |
| 6,127,017 | A | | 10/2000 | Hirata et al. |
| 6,315,851 | B1 | * | 11/2001 | Mazurek et al. ......... 156/231 |
| 6,497,780 | B1 | * | 12/2002 | Carlson .................... 156/230 |
| 6,521,324 | B1 | * | 2/2003 | Debe et al. ............... 156/235 |
| 6,524,418 | B2 | * | 2/2003 | Yamasaki et al. ......... 156/230 |
| 6,544,369 | B1 | * | 4/2003 | Kitamura et al. ......... 156/230 |
| 6,623,788 | B1 | * | 9/2003 | Wang et al. .............. 427/130 |
| 6,746,754 | B1 | * | 6/2004 | Wang et al. .......... 428/694 ST |

* cited by examiner

Primary Examiner—Stevan A. Resan
Assistant Examiner—Louis Falasco
(74) Attorney, Agent, or Firm—McDermott Will & Emery LLP

(57) ABSTRACT

A method of manufacturing a magnetic recording medium including a servo pattern, comprising steps of:
(a) providing a non-magnetic substrate including at least one major surface;
(b) providing a stamper having a surface with a plurality of recesses forming a negative image of a servo pattern;
(c) forming a layer of a partially dried sol-gel material having a first surface in conformal contact with the recess-patterned surface of the stamper and an exposed second surface opposite the first surface;
(d) urging the major surface of the substrate into contact with the exposed second surface of the sol-gel layer;
(e) removing the stamper from contact with the layer of sol-gel material to expose the recess-patterned surface thereof;
(f) converting the partially dried sol-gel layer to a glass-like layer while preserving the recess pattern in the surface thereof; and
(f) forming on the recess-patterned surface a laminate of layers constituting a servo-patterned magnetic recording medium.

5 Claims, 3 Drawing Sheets

SERVO PATTERN FORMATION VIA TRANSFER OF SOL-GEL LAYER AND MAGNETIC MEDIA OBTAINED THEREBY

CROSS-REFERENCE TO RELATED APPLICATIONS

This application is a divisional of application Ser. No. 10/079,516 filed on Feb. 22, 2002, now U.S. Pat. No. 6,723,198, which claims priority from U.S. provisional patent application Ser. No. 60/293,839 filed May 24, 2001, the entire disclosures of which are incorporated herein by reference.

FIELD OF THE INVENTION

The present invention relates to methods for forming servo patterns in substrates for magnetic recording media utilized in high areal, high track density applications, and to magnetic recording media produced thereby. The invention has particular utility in the manufacture of magnetic data/information storage and retrieval media, e.g., hard disks, utilizing very hard-surfaced, high modulus substrates such as of glass, ceramic, and glass-ceramic materials.

BACKGROUND OF THE INVENTION

Magnetic recording media are widely used in various applications, particularly in the computer industry. A portion of a conventional recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP); a seed layer 12A of an amorphous material,. e.g., NiAl; a polycrystalline underlayer 12B, typically of chromium (Cr) or a Cr-based alloy; a magnetic layer 13, e.g., of a cobalt (Co)-based alloy; a protective overcoat layer 14, typically containing carbon (C), e.g., diamond-like carbon ("DLC"); and a lubricant topcoat layer 15, typically of a perfluoropolyether compound, applied by dipping, spraying, etc.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

Disk drives typically comprise a magnetic head assembly mounted on the end of a support or actuator arm which positions the head radially over the disk surface. If the actuator arm is held stationary, the magnetic head assembly will pass over a circular path on the disk surface known as a track, and information can be read from or written to that track. Each concentric track has a unique radius, and reading and writing information from or to a specific track requires the magnetic head to be located above the track. By moving the actuator arm, the magnetic head assembly is moved radially over the disk surface between tracks.

The disk drive must be able to differentiate between tracks on the disk and to center the magnetic head over any particular track. Most disk drives use embedded "servo patterns" of magnetically recorded information on the disk. The servo patterns are read by the magnetic head assembly to inform the disk drive of the track location. Tracks typically include both data sectors and servo patterns. Each data sector contains a header followed by a data section. The header may include synchronization information to synchronize various timers in the disk drive to the speed of disk rotation, while the data section is used for recording data. Typical servo patterns are described in, for example, U.S. Pat. No. 6,086,961, the disclosure of which is incorporated herein by reference.

Servo patterns are usually written on the disk during manufacture of the disk drive, after the drive is assembled and operational. The servo pattern information, and particularly the track spacing and centering information, needs to be located very precisely on the disk surface. However, at the time the servo patterns are written, there are no reference locations on the disk surface which can be perceived by the disk drive. Accordingly, a highly specialized device known as a "servo-writer" is used during writing of the servo-patterns. Largely because of the locational precision needed, servo-writers are expensive, and servo-writing is a time-consuming process.

One approach (i.e., "PERM" disks, manufactured by Sony Corp.) to avoid traditional servo-writing has been to injection mold or stamp servo patterns on a polymer-based substrate disk. A constant thickness layer of magnetic recording material is then applied over the entire disk surface, including the depressions and protrusions of the servo patterns. After all of the constituent layers of the medium have been applied to the disk, a magnetic bias is recorded on the servo patterns. For example, a first magnetic field may magnetically initialize the entire disk at a one setting. Then a second magnetic field, located at the surface of the disk and e.g., provided by the magnetic head of the disk drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disk servo patterns show magnetic transitions between the depressions and the protrusions.

Meanwhile, the continuing trend toward manufacture of very high areal density magnetic recording media at reduced cost provides impetus for the development of lower cost materials, e.g., polymers, glass, ceramics, and glass-ceramics composites as replacements for the conventional Al alloy-based substrates for magnetic disk media. However, poor mechanical and tribological performance, track mis-registration ("TMR"), and poor flyability have been particularly problematic in the case of polymer-based substrates fabricated as to essentially copy or mimic conventional hard disk design features and criteria. On the other hand, glass, ceramic, or glass-ceramic materials are attractive candidates for use as substrates for very high areal density disk recording media because of the requirements for high performance of the anisotropic thin film media and high modulus of the substrate. However, the extreme difficulties encountered with grinding and lapping of glass, ceramic, and glass-ceramic composite materials have limited their use to only higher cost applications such as mobile disk drives for "notebook"-type computers.

Sub-micron flyability (e.g., <0.5µ inch) of the recording transducer or head over a patterned media surface is a stringent requirement for obtainment of very high areal density recording media. However, attempts to achieve the requisite surface topography on glass, ceramic, or glass-ceramic composite substrates have been unsuccessful due to their extreme hardness (e.g., glass substrates have a Knoop hardness greater than about 760 kg/mm$^2$ compared with about 550 kg/mm$^2$ for Al alloy substrates with NiP plating layers). In addition, the low flowability and extreme hardness of these substrate materials effectively precludes formation of servo patterns in the surfaces thereof by injection molding or stamping, as has been performed with polymer-based substrates.

A recently developed approach for forming servo patterns in hard-surfaced, high modulus alternative substrate materials, such as the glass, ceramic, and glass-ceramic materials described above, is based upon the discovery that the surfaces of such materials may be modified, i.e., reduced in hardness, so as to facilitate formation of servo patterns therein, as by a simple and conveniently performed embossing process. According to this methodology, modification (i.e., reduction) of surface hardness of high modulus substrates for use in the manufacture of thin film magnetic recording media is obtained by first forming a relatively soft coating layer on the substrate surface, embossing the desired servo pattern in the exposed upper surface of the relatively soft coating layer, and then converting the relatively soft layer to a relatively hard layer while retaining the embossed servo pattern therein. The thus-formed substrate with embossed servo pattern in the exposed surface thereof is then subjected to thin film deposition thereon for forming the layer stack constituting the magnetic recording medium. Thus, the method advantageously provides servo-patterned magnetic recording media without requiring servo-writing subsequent to media fabrication.

More specifically, according to the above methodology, a relatively soft layer of a sol-gel is initially formed on the surface of the high modulus glass, ceramic, or glass-ceramic composite substrate, e.g., in disk form. By way of illustration, but not limitation, a sol-gel layer having a thickness of from about 0.2 to about 1 µm may be formed on the substrate surface by any convenient technique, e.g., spin coating of a solution of the sol-gel. A suitable sol-gel solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/H$_2$O/HNO$_3$ of ¼–30/>0.05. The nitric acid acts as a catalyst for conversion of the TEOS or TMOS to a SiO$_2$ sol according to the following reaction (1), illustratively shown for TEOS:

$$nSi(OC_2H_5)_4 + 2nH_2O \rightarrow nSiO_2 + 4nC_2H_5OH \quad (1)$$

with ethanol (C$_2$H$_5$OH) being produced as a reaction product in solution. After completion of reaction, butanol (C$_4$H$_9$OH) is added to the solution as a drying retardation agent at molar ratios of TEOS/H$_2$O/HNO$_3$/C$_4$H$_9$OH of e.g., 1/5/0.05/>4. Such solution, when applied to the substrate surface as by spin coating, forms a very smooth film with a minimum amount of surface microwaves. The spin coating process effects removal, e.g., as by centrifugation and evaporation, of a portion of the solvents from the initially applied solution. The resultant partially dried film or layer is glass-like, principally comprised of silica (SiO$_2$) molecular clusters together with the various solvents (H$_2$O, C$_2$H$_5$OH, C$_4$H$_9$OH), and adheres well to the substrate surface. The sol-gel film or layer is of a porous structure with the solvents saturated in the micropores thereof.

The as-deposited, relatively soft sol-gel film or layer applied to the hard-surfaced substrate is then subjected to an embossing process for forming a servo pattern in the surface thereof, comprising a patterned plurality of depressions and protrusions, e.g., by utilizing a stamper having a negative image of the desired servo pattern or an equivalently performing device. The exposed, upper surface of the relatively soft sol-gel layer may also be subjected to mechanical texturing (after drying in air but prior to sintering), e.g., as by a standard NiP texturing process utilizing an abrasive size of about 0.25 µm, in order to enable formation of oriented media critical for achieving high areal density recording.

Subsequent to servo pattern formation (and mechanical texturing, if desired) of the as-deposited, partially dried, relatively soft sol-gel film or layer, a sintering process is performed at an elevated temperature of from about 300 to above about 1000° C. (depending upon the withstand temperature of the substrate material, i.e., which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer into a substantially fully densified glass layer having a density and hardness approaching that of typical silica glass (<1.5 g/cm³), or into a partially densified "glass-like" layer. The embossed servo pattern (and mechanical texturing) formed in the exposed upper surface of the relatively soft sol-gel layer is preserved in the corresponding exposed upper surface of the sintered glass or glass-like layer.

Formation of thin film magnetic media on the thus-formed glass-coated, servo patterned/mechanically textured substrates is accomplished utilizing conventional thin film deposition techniques, e.g., sputtering, for forming the layer stack comprising a seed layer, polycrystalline underlayer, magnetic layer, and protective overcoat layer.

The above-described sol-gel-based process combines the advantages of low-cost processing with the superior optical, mechanical, and chemical properties of silica glass ($SiO_2$) for fabricating high performance, servo-patterned magnetic recording media, and thus is an attractive candidate for future disk-based magnetic recording media and systems. In order to achieve high areal density magnetic recording utilizing such alternative substrate materials with embossed servo patterns formed in spin-coated sol-gel layers and with read/write transducers operating at very low flying heights, extremely precise (or faithful) replication of the servo master pattern on the imprinting surface of the stamper is required. However, the requisite degree or precision of servo pattern replication is generally not realized when a stamper is utilized to imprint/emboss the pattern in the surface of a sol-gel coated disk substrate, even when the imprinting/embossing is performed under a high pressure. It is believed that the poor replication quality arises from difficulty in compressing the partially dried sol-gel layer to the extent necessary for complete, i.e., faithful, replication of the topographical features, e.g., depressions and protrusions, in the imprinting surface of the stamper. For example, the depths of depressions and the wall angles of the features of servo patterns formed by pressure-induced embossing/imprinting of sol-gel coated disk substrates generally do not replicate the depths and sharpness of the corresponding features of the imprinting surface of the stamper. In particular, desired wall angles >450° and flat lands between adjacent grooves are generally not obtained.

In view of the above, there exists a need for improved methodology and means for providing disk substrates for magnetic recording media, which substrates are constituted of high modulus, very hard materials such as of glass, ceramic, or glass-ceramic, with at least one major recording surface having requisite topography for enabling operation with flying head read/write transducers/heads operating at very low flying heights and with very precisely contoured patterns, e.g., servo patterns, provided therein. More specifically, there exists a need for an improved method for rapidly and cost effectively forming patterned sol-gel films or layers on substrate surfaces, e.g., servo patterned films or layers, which patterns faithfully replicate master patterns. In addition, there exists a need for an improved, high areal density magnetic recording medium including a high hardness, high modulus substrate having a servo pattern integrally formed therewith in the surface of a densified, glass-like sol-gel layer, and capable of operation with read/write transducers operating at sub-micron flying heights.

The present invention addresses and solves problems and difficulties attendant upon the formation of faithfully replicated patterns, e.g., servo patterns, in the surfaces of sol-gel films on the surfaces of very hard materials, e.g., of glass, ceramic, or glass-ceramic, utilized as substrates in the manufacture of very high areal density magnetic recording media, while maintaining full capability with substantially all aspects of conventional automated manufacturing technology for the fabrication of thin-film magnetic media. Further, the methodology and means afforded by the present invention enjoy diverse utility in the manufacture of various other devices and media requiring formation of surfaces with precisely replicated formed therein.

DISCLOSURE OF THE INVENTION

An advantage of the present invention is an improved method of manufacturing a patterned magnetic recording medium.

Another advantage of the present method is an improved method of forming a magnetic recording medium including an integrally formed servo pattern.

Yet another advantage of the present invention is an improved patterned magnetic recording medium.

Still another advantage of the present invention is an improved magnetic recording medium including an integrally formed servo pattern.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other aspects and advantages are obtained in part by a method of manufacturing a patterned magnetic recording medium, comprising the steps of:

(a) providing a non-magnetic substrate including at least one major surface;

(b) providing a stamper having a recess-patterned surface comprising a negative image of a pattern of recesses to be formed in the medium;

(c) forming a layer of a material having a first surface in conformal contact with the recess-patterned surface of the stamper and an exposed second surface opposite the first surface;

(d) placing the major surface of the substrate in contact with the exposed second surface of the layer of material; and (e) removing the recess-patterned surface of the stamper from contact with the first surface of the layer of material; whereby the layer of material is transferred to the major surface of the substrate, such that the second surface of the layer of material is in contact with the major surface of the substrate, and the first surface of the layer of material is exposed and includes a positive image of the pattern of recesses.

According to embodiments of the present invention, step (a) comprises providing a disk-shaped, high modulus substrate having a pair of major surfaces and comprised of a glass, ceramic, or glass-ceramic material; and step (b) comprises providing a stamper wherein at least the patterned surface is comprised of a metal, polymer, or carbon.

In accordance with certain embodiments of the present invention, step (b) comprises providing a stamper having a recess-patterned surface comprising a negative image of a servo pattern to be formed in said magnetic recording medium.

According to further embodiments of the present invention, step (c) comprises forming a layer of a partially dried sol-gel material in conformal contact with the recess-patterned surface of the stamper; and according to preferred embodiments of the present invention, step (c) comprises forming a layer of a partially dried sol-gel material comprising a micro-porous structure of silica ($SiO_2$) particles with solvents saturated in the micro-pores thereof, e.g., by spin coating a layer of a $SiO_2$-containing sol solution on the recess-patterned surface of the stamper.

In accordance with still other embodiments of the present invention, step (a) comprises providing a non-magnetic substrate wherein a spin-coated, partially dried layer of a sol-gel material comprising a micro-porous structure of silica ($SiO_2$) particles with solvents saturated in the micro-pores thereof comprises the at least one major surface of the substrate.

Certain embodiments of the present invention comprise the further step of:

(f) converting the layer of partially dried sol-gel material to a glass or glass-like layer while preserving the pattern of recesses in the exposed first surface thereof, e.g., by sintering the layer of partially dried sol-gel material at an elevated temperature.

Yet other embodiments of the present invention comprise the still further step of:

(g) forming a laminate of thin film layers including in sequence: seed, underlayer, magnetic recording, protective overcoat, and lubricant topcoat layers over the exposed first surface of the glass or glass-like layer including the positive image of the pattern of recesses.

According to further embodiments of the present invention, step (d) comprises urging the major surface of the substrate into contact with the second surface of the layer of material by application of pressure; and step (e) comprises separating the recess-patterned surface of the stamper from the first surface of the layer of material while maintaining the second surface of the layer of material in contact with the major surface of the substrate.

Another aspect of the present invention is a structure for use in the manufacture of a patterned thin film magnetic recording medium, comprising:

a non-magnetic substrate including at least one major surface; and a layer of a glass or glass-like material on the major surface of the substrate, the layer of glass or glass-like material including an exposed surface having a pattern of recesses formed therein by a process comprising steps of:

(a) providing a non-magnetic substrate having a major surface;

(b) providing a stamper having a recess-patterned surface comprising a negative image of the pattern of recesses to be formed in the medium;

(c) forming a layer of a spin-coated, partially dried sol-gel material on the recess-patterned surface of the stamper, the layer comprising a micro-porous structure of silica ($SiO_2$) particles with solvents saturated in the micro-pores thereof, the layer having a first surface in conformal contact with the recess-patterned surface of the stamper and an exposed second surface opposite the first surface;

(d) urging the major surface of the substrate into contact with the exposed second surface of the layer of partially dried sol-gel material;

(e) removing the recess-patterned surface of the stamper from contact with the first surface of the layer of partially dried sol-gel material while leaving the second surface of the layer of partially dried sol-gel material in contact with the major surface of the substrate, whereby the layer of partially dried sol-gel material is transferred to the major surface of the substrate, such that the first surface of the layer of partially dried sol-gel material is exposed and includes a positive image of the pattern of recesses; and (f) converting the layer of partially dried sol-gel material to a glass or glass-like layer while preserving the pattern of recesses in the exposed first surface thereof.

According to embodiments of the present invention, the non-magnetic substrate comprises a disk-shaped, high modulus substrate having a pair of major surfaces and is comprised of a glass, ceramic, or glass-ceramic material; and the pattern of recesses in the exposed surface of said glass or glass-like layer forms a servo pattern for said magnetic recording medium.

In accordance with certain embodiments of the present invention, the recesses forming the servo pattern are from about 1 to about 500 nm deep, from about 0.001 to about 1 $\mu$m wide, and adjacent recesses are spaced apart at least about 0.001 $\mu$m.

Yet another aspect of the present invention is a servo-patterned magnetic recording medium, comprising the above structure and a laminate of thin film layers formed thereover, the laminate including seed, underlayer, magnetic recording, protective overcoat, and lubricant topcoat layers sequentially formed over the exposed first surface of the glass or glass-like layer including the positive image of the servo pattern formed therein.

Still another aspect of the present invention is a magnetic recording medium, comprising:

a non-magnetic substrate having a surface; and sol-gel-based or derived means for providing a servo pattern which precisely replicates a master servo pattern formed in a surface of a stamper.

According to an embodiment of the present invention, the sol-gel-based or derived means comprises a glass or glass-like layer on the surface of the non-magnetic substrate.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawing, in which the features are not necessarily drawn to scale but rather are drawn as to best illustrate the pertinent features, wherein.

DESCRIPTION OF THE INVENTION

Figure 1:
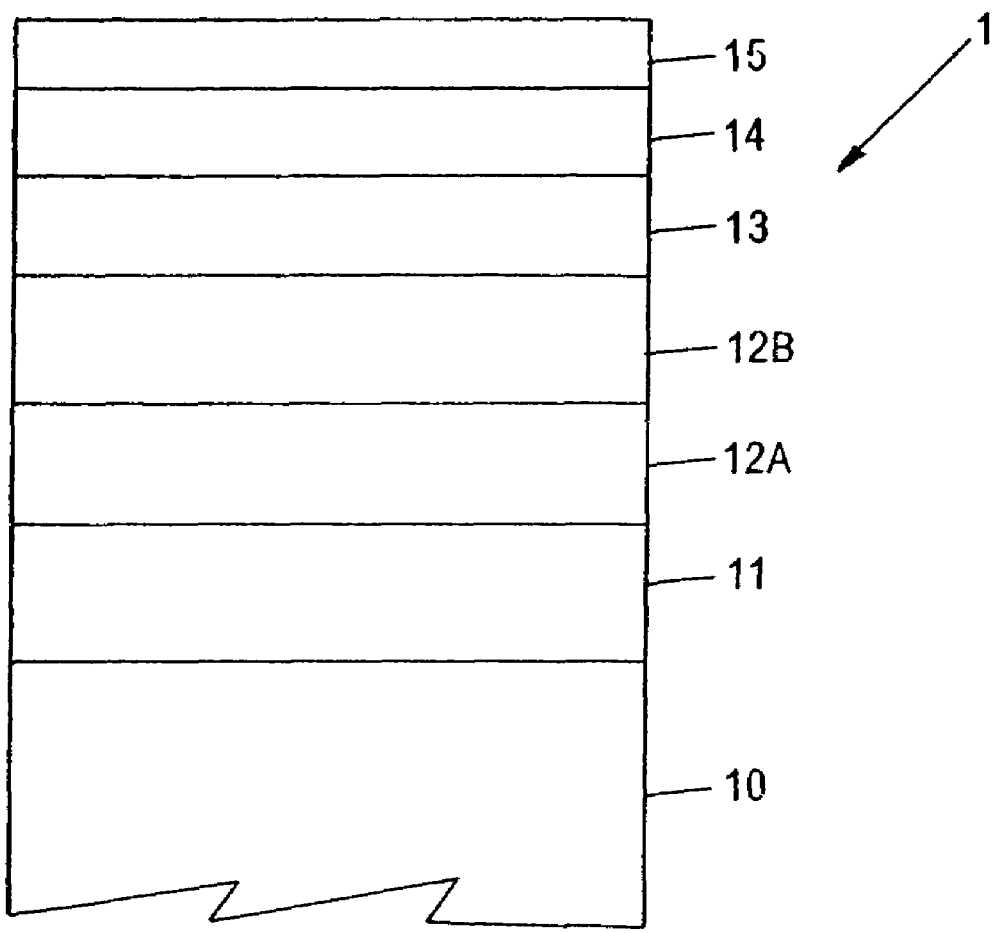
FIG. 1 illustrates, in schematic, simplified cross-sectional view, a portion of a thin film magnetic data/information recording/storage medium.

The present invention addresses and solves problems and difficulties in achieving high fidelity reproduction of patterns formed by imprinting or embossing the surface of a partially dried sol-gel layer overlying a high hardness, high modulus material, such as utilized as a substrate material in the manufacture of thin-film, high areal density magnetic recording media, and is based upon the discovery that faithful replication of patterns, e.g., servo patterns, formed in the imprinting surfaces of stampers may be obtained in the surfaces of partially dried sol-gel layers by means of a sol-gel molding+layer transfer process rather than the heretofore utilized sol-gel imprinting/embossing methodology.

More specifically, according to the prior methodology, the surface of a partially dried $SiO_2$—containing sol-gel layer formed on the surface of a high hardness, high modulus substrate (e.g., by spin coating of a solution containing $SiO_2$ gel particles) is patterned by urging (i.e., pressing) an imprinting surface of a stamper against the surface of the sol-gel layer to selectively compress portions thereof corresponding to protrusions in the imprinting surface of the stamper, whereas, in a first step according to the inventive methodology, the partially dried $SiO_2$—containing sol-gel layer is initially formed on the imprinting surface of the stamper, as by spin coating of a solution containing $SiO_2$ gel particles, such that the pattern features (e.g., depressions) of the imprinting surface are substantially completely filled by a process similar to molding. According to the next (i.e., second) step of the inventive methodology, the exposed upper surface of the partially dried sol-gel layer is urged against the surface of the high hardness, high modulus substrate (which itself may optionally be coated with a partially dried sol-gel layer) to effect mutual adhesion of the former and latter surfaces; and, in a following (i.e., third) step according to the inventive methodology, the imprinting surface of the stamper is removed from contact with the partially dried sol-gel layer, leaving the sol-gel layer adhered to the substrate surface with the exposed upper surface thereof comprising a faithfully replicated positive image of the patterned imprinting surface of the stamper.

Thus, by utilizing methodology wherein the patterned sol-gel layer is formed by a recess filling/molding process rather than a compressing process, patterned sol-gel layers are obtained which more faithfully replicate the features of the imprinting surface of the stamper. Specifically, the inventive methodology is capable of high fidelity reproduction of the pattern features such that the wall angles of the patterned sol-gel layer are equivalent to the corresponding wall angles of the imprinting surface and the depths of the depressions formed in the sol-gel layer are >90% of the height of the protrusions of the imprinting surface. The inventive methodology, therefore, provides a major advance in obtaining useful servo patterns in sol-gel layers, i.e., with wall angles >45° and substantially flat land areas between adjacent depressions or grooves.

Figure 2A:
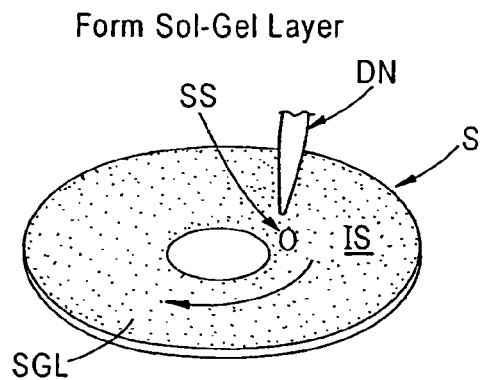
FIGS. 2(A)–2(C) illustrate, in schematic, simplified perspective view, a sequence of steps for performing an embodiment of a method according to the present invention.
Figure 2B:
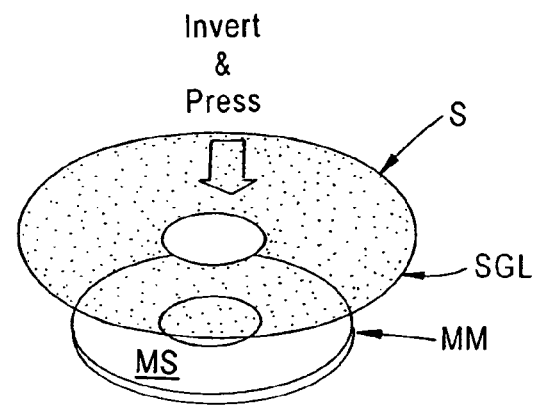
Figure 2C:
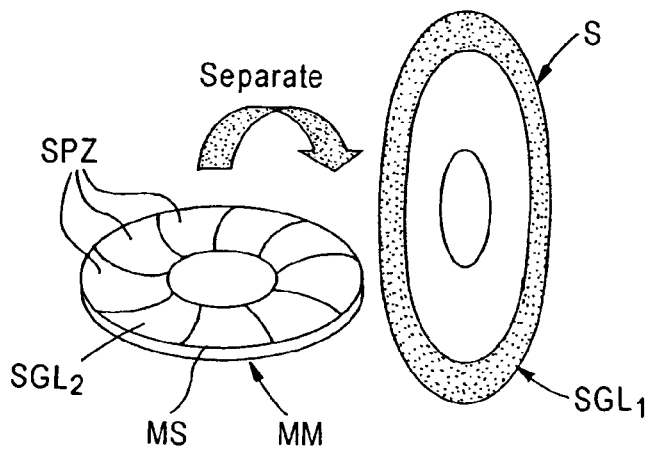

Referring now to FIGS. 2(A)–2(C), shown therein in schematic, simplified perspective view, is a sequence of steps for performing an embodiment of a method for forming a pattern in a sol-gel layer according to the present invention. As illustrated in FIG. 1(A), in a first step according to the embodiment, a stamper S is provided having, e.g., an annular disk-shaped imprinting surface IS, wherein at least the imprinting surface IS is comprised of a suitable metal or alloy (e.g., Ni, Pt, etc.), carbon (C), or a polymer (e.g., polyetherimide, polycarbonate, etc.). Imprinting surface IS includes a negative image of a pattern desired to be formed in the surface of a partially dried sol-gel layer, e.g., a servo pattern comprising a plurality of recesses, grooves, or other shape depressions, with flat-surfaced land areas (=projections) therebetween. By way of illustration only, for a typical servo pattern contemplated for formation according to the instant invention, the recesses forming the servo pattern are from about 1 to about 500 nm deep, from about 0.001 to about 1 $\mu$m wide, and adjacent recesses are spaced apart at least about 0.001 $\mu$m.

Still referring to FIG. 2(A), by way of illustration, but not limitation, a sol-gel layer SGL having a thickness of from about 0.001 to about 10 $\mu$m, e.g., about 0.2 $\mu$m, is then formed on the imprinting surface IS by spin coating of a $SiO_2$ sol solution SS supplied drop-wise via a dispensing nozzle DN. A suitable $SiO_2$ solution for use according to the invention may be prepared as previously described. Such solution SS, when applied to the imprinting surface IS by spin coating, forms a very smooth film with a minimum amount of surface microwaves. A portion of the solvent(s) contained in the layer or film of sol solution is removed during the spin coating process. The resultant partially dried sol-gel film or layer SGL is glass-like and is principally comprised of silica ($SiO_2$) molecular clusters together with the remaining amounts of the various solvents ($H_2O$, $C_2H_5OH$, $C_4H_9OH$). The sol-gel film or layer SGL is of a porous structure with the solvents saturated in the micropores thereof.

Referring now to FIG. 2(B), in a next step according to the illustrated embodiment of the invention, a surface MS of a substrate MM having a smaller diameter than that of stamper S, e.g., an annular disk-shaped substrate for a hard disk magnetic recording medium, is provided in facing relation to the annular disk-shaped imprinting surface IS of stamper S coated with the partially dried sol-gel layer SGL and urged into conformal contact therewith, as by applying pressure to either or both of substrate MM or stamper S. The amount of pressure applied to stamper S and/or substrate MM is not critical for practice of the invention, and suitable pressures may range from about 10,000 to about 60,000 lbs/in$^2$.

Substrate MM may comprise any of the materials typically utilized as substrates for hard disk magnetic recording media, with high hardness, high modulus glass, ceramic, or glass-ceramic materials being preferred according to the invention, wherein servo patterns are to be created in a sol-gel layer formed on a surface thereof. In addition, if desired, surface MS of substrate MM may be provided with an about 0.001 to about 10 $\mu$m thick, preferably about 0.2 $\mu$m thick, spin-coated, partially dried $SiO_2$ sol-gel layer SGL' prior to placement in contact with sol-gel layer SGL formed on the imprinting surface IS of stamper S.

Adverting to FIG. 2(C), in a next step according to the invention, stamper S with its imprinting surface IS is removed from contact with media substrate MM, such that the (inner) portion of sol-gel layer SGL in contact with the substrate surface MS separates from the imprinting surface IS of stamper S and remains in adherent contact with the former, leaving an outer, annular-shaped band $SGL_1$ of sol-gel layer SGL in contact with the peripheral portion of the imprinting surface IS of stamper S, and an inner, annular-shaped band $SGL_2$ of sol-gel layer SGL transferred to surface MS of media substrate MM, wherein the patterned surface thereof (originally in contact with the imprinting surface IS of stamper S) forms the exposed, outer surface of the inner, annular-shaped band $SGL_2$ of sol-gel layer SGL comprising a plurality of servo-patterned sectors or zones SPZ.

Subsequent to the above-described transfer of the inner, annular band-shaped portion $SGL_2$ of the servo patterned, partially dried sol-gel film or layer SGL, a sintering process is performed at an elevated temperature from about 300 to above about 1000° C. (depending upon the withstand temperature of the substrate material, i.e., which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer portion $SGL_2$ into a substantially fully densified glass layer having a density and hardness approaching that of typical silica glass (<1.5 g/cm$^3$), or into a partially densified "glass-like" layer. The servo pattern formed in the exposed upper surface of the partially dried sol-gel layer portion $SGL_2$ is preserved in the corresponding exposed upper surface of the sintered glass or glass-like layer.

Formation of thin film magnetic media (of structure similar to that illustrated in FIG. 1 and described above) on the thus-formed glass-coated, servo-patterned substrates is then accomplished utilizing conventional thin film deposition techniques, e.g., sputtering, for forming a layer stack comprising seed layer 12A, polycrystalline underlayer 12B, magnetic layer 13, and protective overcoat layer 14. Lubricant topcoat layer 15 may also be applied in conventional manner, e.g., by dipping, spraying, or vapor deposition.

Figure 3A:
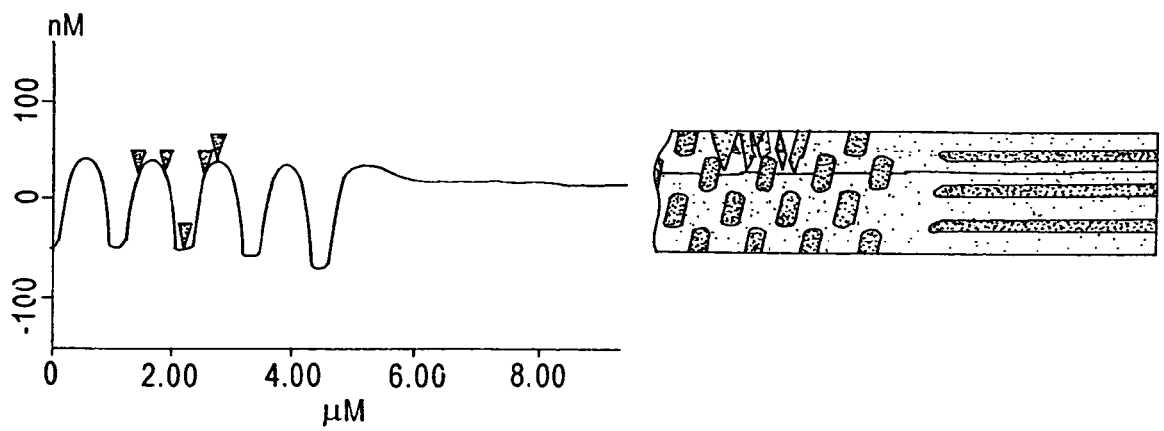
FIGS. 3(A)–3(C) are Atomic Force Microscopy (AFM) images and graphical representations thereof obtained for a stamped (i.e., embossed) pattern formed in a partially dried sol-gel layer coated on a disk substrate according to prior practices, for a pattern formed in a partially dried sol-gel layer according to the layer transfer method of the present invention, and for the imprinting surface of a polyetherimide-based stamper prior to use, respectively.
Figure 3B:
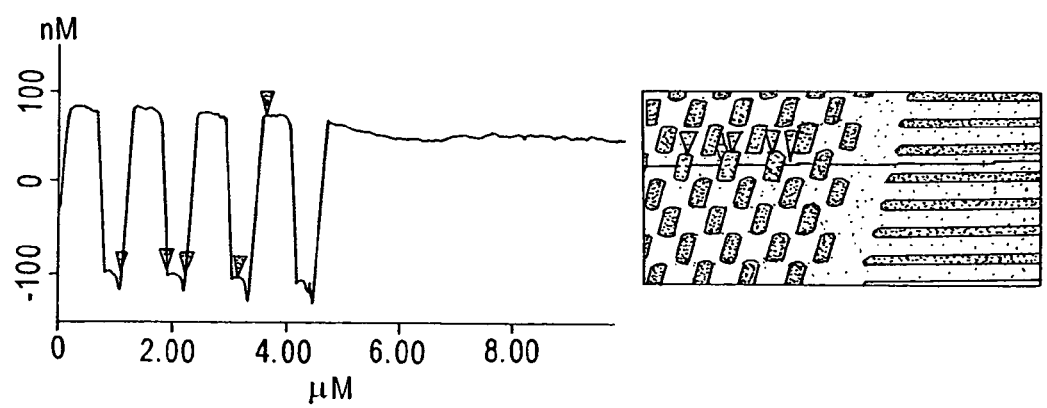
Figure 3C:
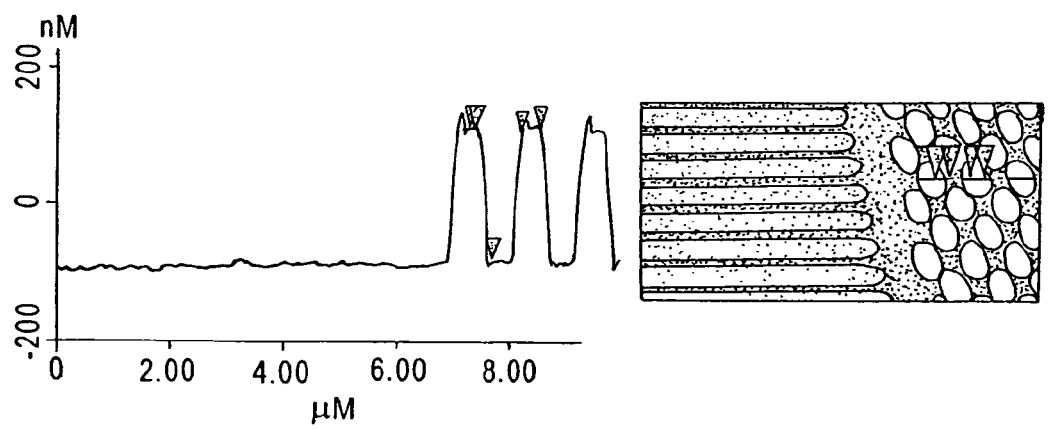

Reference is now made to FIGS. 3(A)–3(C) for an illustration of the efficacy of the inventive methodology in forming faithfully replicated servo patterns in partially dried sol-gel coated substrates for use in the manufacture of thin-film magnetic recording media. Specifically, FIGS. 3(A)–3(C) are Atomic Force Microscopy (AFM) images and graphical representations thereof obtained for a stamped, (i.e., embossed or imprinted) pattern formed in a partially dried sol-gel layer coated on a disk substrate according to prior practices, for a pattern formed in a partially dried sol-gel layer according to the layer transfer method of the present invention, and for the imprinting surface of a polyetherimide-based stamper prior to use, respectively.

As is evident from a comparison of the graphical representations of FIGS. 3(A)–3(C), the inventive sol-gel molding + layer transfer methodology provides a substantial improvement in fidelity of servo pattern replication vis-à-vis the prior methodology wherein the stamper is utilized for imprinting/embossing of the desired pattern. Specifically, the graph of FIG. 3(A) for the prior methodology clearly indicates that rounded rather than flat land areas are disadvantageously formed in the partially dried sol-gel layer between adjacent grooves or depressions, and the latter have a peak-to-valley depth of only about 100 nm. By contrast, the graph of FIG. 3(B) clearly indicates that servo patterns formed in partially dried sol-gel layers according to the molding+layer transfer process of the present invention advantageously include substantially flat land areas between adjacent grooves or depressions, and the latter have a peak-to-valley depth of about 200 nm, both of which faithfully replicate the corresponding land areas and peak-to-peak depth of the master pattern of grooves or depressions formed in the stamper surface, as shown in FIG. 3(C). It should also be noted that, in addition to faithful replication of the wall angles of the projections, a comparison of FIGS. 3(B) and (C) indicates that even small anomalies in the stamper surface, e.g., the lip or protrusion at the land area, are well replicated when the sol-gel layer is patterned according to the inventive methodology.

Thus, the present invention advantageously provides improved processing techniques and methodologies, including molding+transfer of patterned, partially dried, sol-gel layers from a molding or imprinting surface of a stamper to a surface of a substrate for a magnetic recording medium, which methodology can be practiced at low cost to yield improved, servo-patterned substrates comprised of high hardness, high modulus materials suitable for the manufacture of high areal recording density magnetic recording media operable at sub-micron flying heights, and magnetic recording media including such improved, servo-patterned substrates.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A structure for use in the manufacture of a patterned thin film magnetic recording medium, comprising:
   a non-magnetic substrate including at least one major surface; and
   a layer of a glass or glass-like material on said major surface of said substrate, said layer of glass or glass-like material including an exposed surface having a pattern of recesses formed therein by a process comprising steps of:
   (a) providing a non-magnetic substrate having a major surface;
   (b) providing a stamper having a recess-patterned surface comprising a negative image of said pattern of recesses to be formed in said medium;
   (c) forming a layer of a spin-coated, partially dried sol-gel material on said recess-patterned surface of said stamper, said layer comprising a micro-porous structure of silica ($SiO_2$) particles with solvents saturated in the micro-pores thereof, said layer having a first surface in conformal contact with said recess-patterned surface of said stamper and an exposed second surface opposite said first surface;
   (d) urging said major surface of said substrate into contact with said exposed second surface of said layer of partially dried sol-gel material;
   (e) removing said recess-patterned surface of said stamper from contact with said first surface of said layer of partially dried sol-gel material while leaving said second surface of said layer of partially dried sol-gel material in contact with said major surface of said substrate, whereby said layer of partially dried sol-gel material is transferred to said major surface of said substrate, such that said first surface of said layer of partially dried sol-gel material is exposed and includes a positive image of said pattern of recesses; and
   (f) converting said layer of partially dried sol-gel material to a glass or glass-like layer while preserving said pattern of recesses in said exposed first surface thereof.

2. The structure as in claim 1, wherein said non-magnetic substrate comprises a disk-shaped, high modulus substrate having a pair of major surfaces and is comprised of a glass, ceramic, or glass-ceramic material.

3. The structure as in claim 1, wherein said pattern of recesses in said exposed surface of said glass or glass-like layer forms a servo pattern for said magnetic recording medium.

4. The structure as in claim 3, wherein said recesses are from about 1 to about 500 nm deep, from about 0.001 to about 1 $\mu$m wide, and adjacent recesses are spaced apart at least about 0.001 $\mu$m.

5. A servo-patterned magnetic recording medium, comprising the structure as in claim 4 and a laminate of thin film layers formed thereover, said laminate including seed, underlayer, magnetic recording, protective overcoat, and lubricant topcoat layers sequentially formed over said exposed first surface of said glass or glass-like layer including said positive image of said servo pattern formed therein.

* * * * *